June 5, 1956 R. C. BRITTON ET AL 2,748,919
LINE-SHAFT ROLLER CONVEYOR WITH SHIFTABLE BEARINGS
Filed Aug. 6, 1953 5 Sheets-Sheet 1
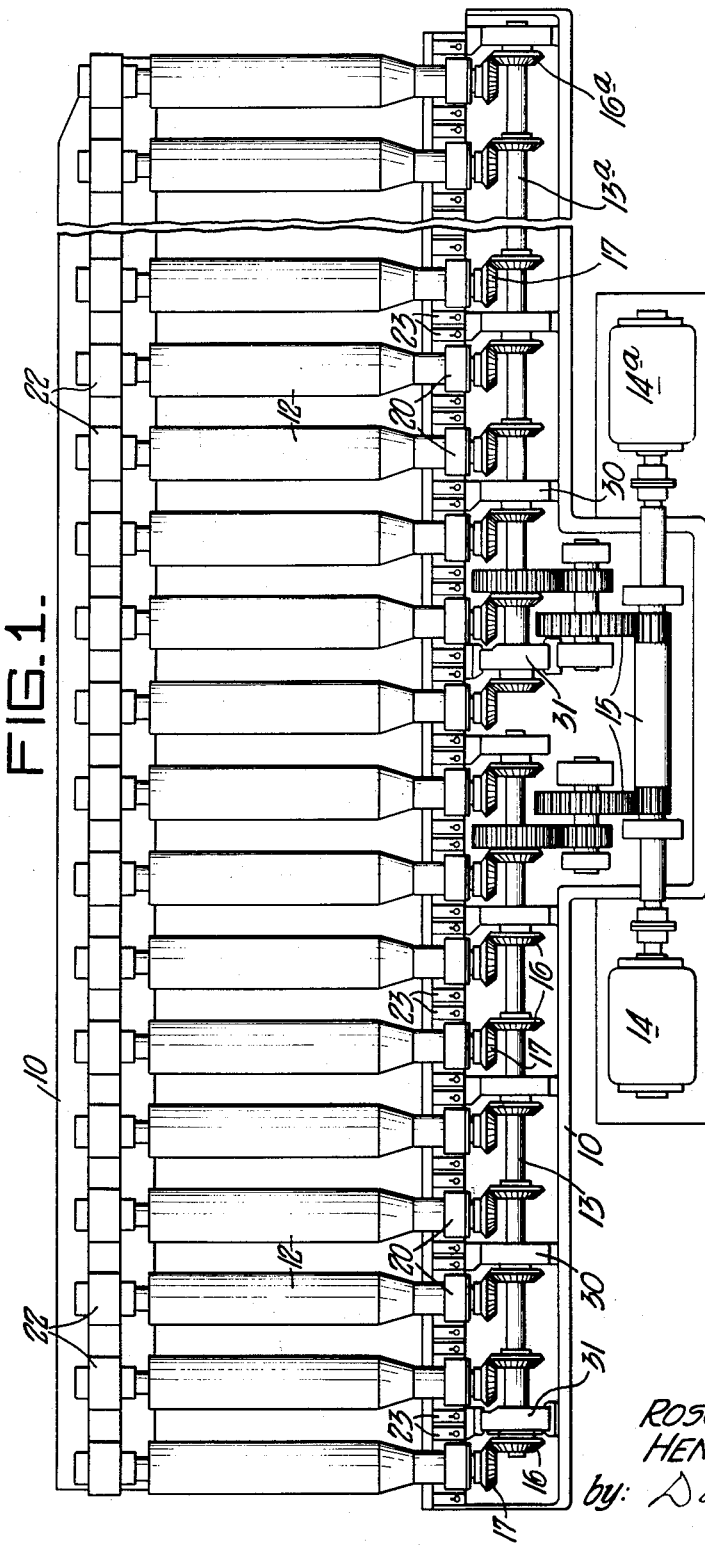
Inventors:
ROSCOE C. BRITTON and
HENRY HALTOF,
by: Donald G. Dalton
Their Attorney.

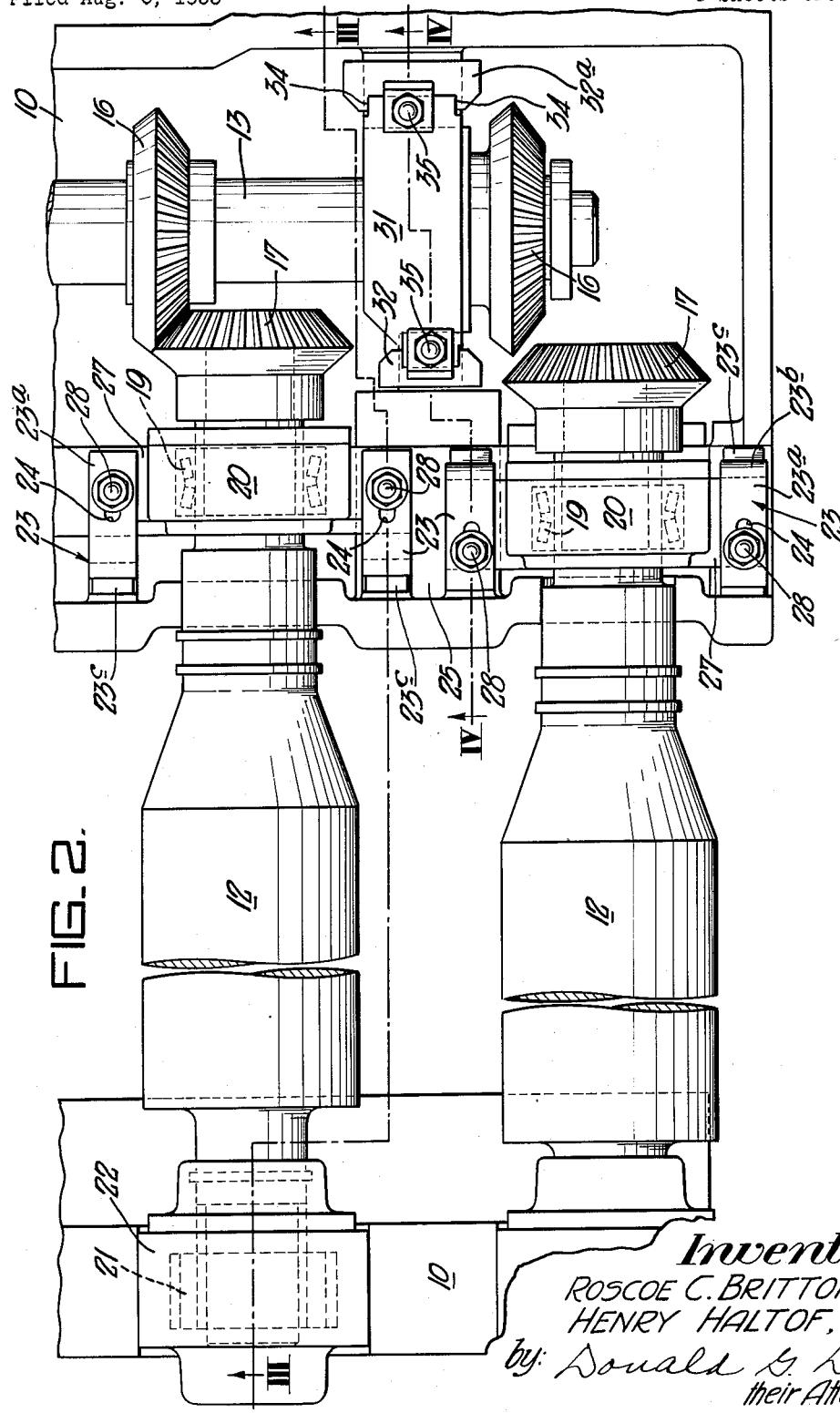

June 5, 1956  R. C. BRITTON ET AL  2,748,919
LINE-SHAFT ROLLER CONVEYOR WITH SHIFTABLE BEARINGS
Filed Aug. 6, 1953  5 Sheets-Sheet 3
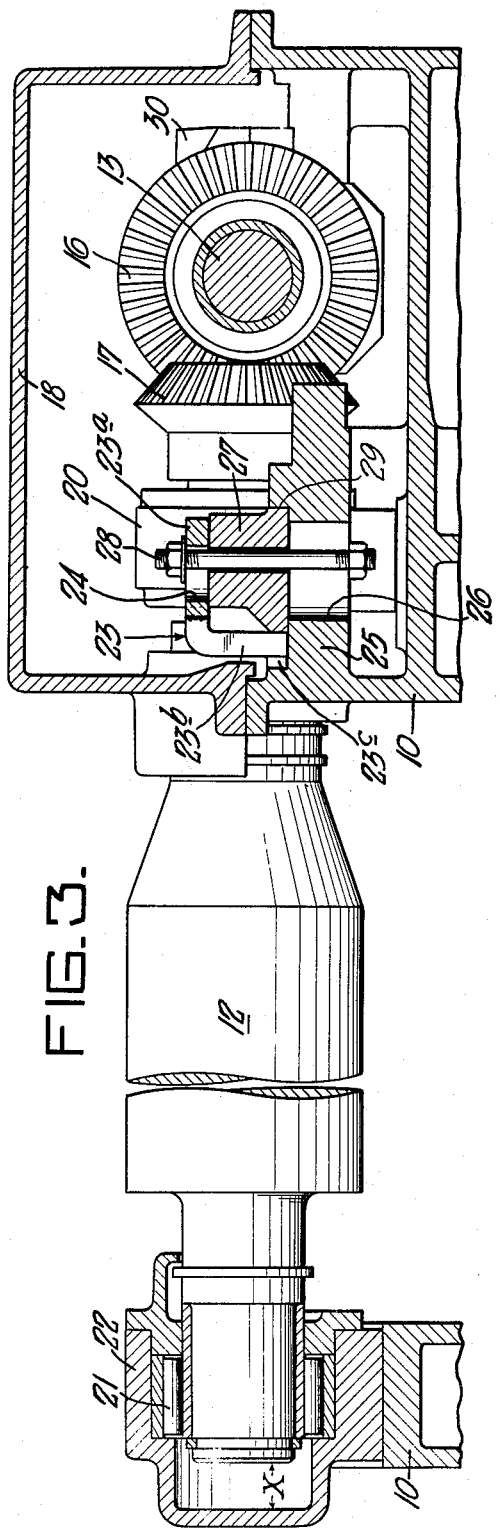
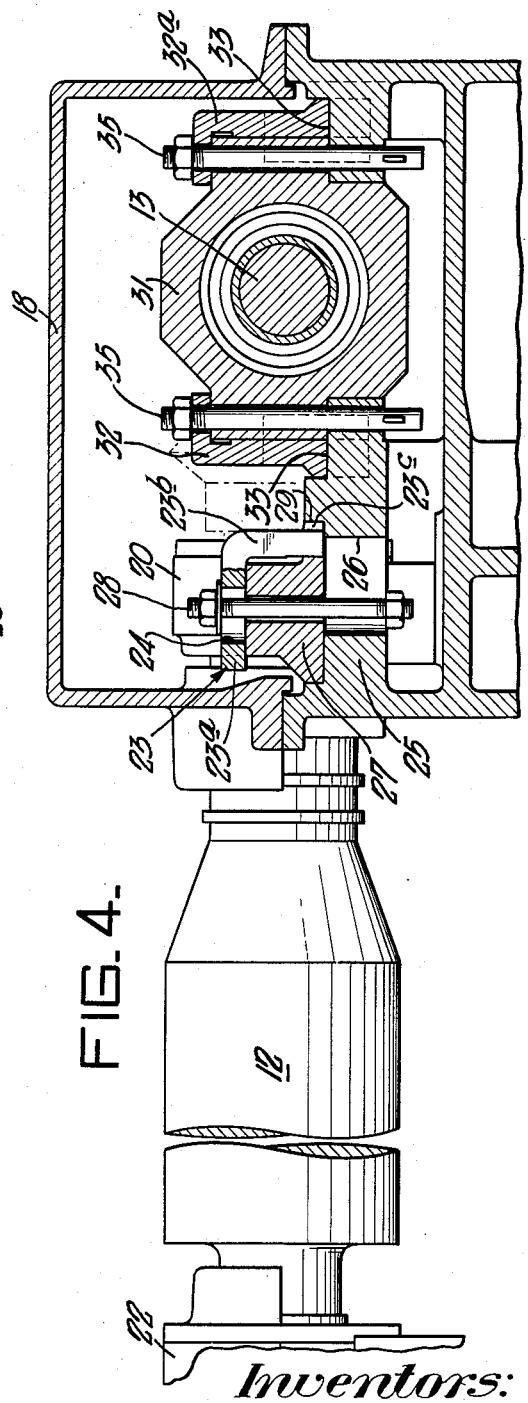
Inventors:
ROSCOE C. BRITTON and
HENRY HALTOF,
by: Donald G. Dalton
their Attorney.

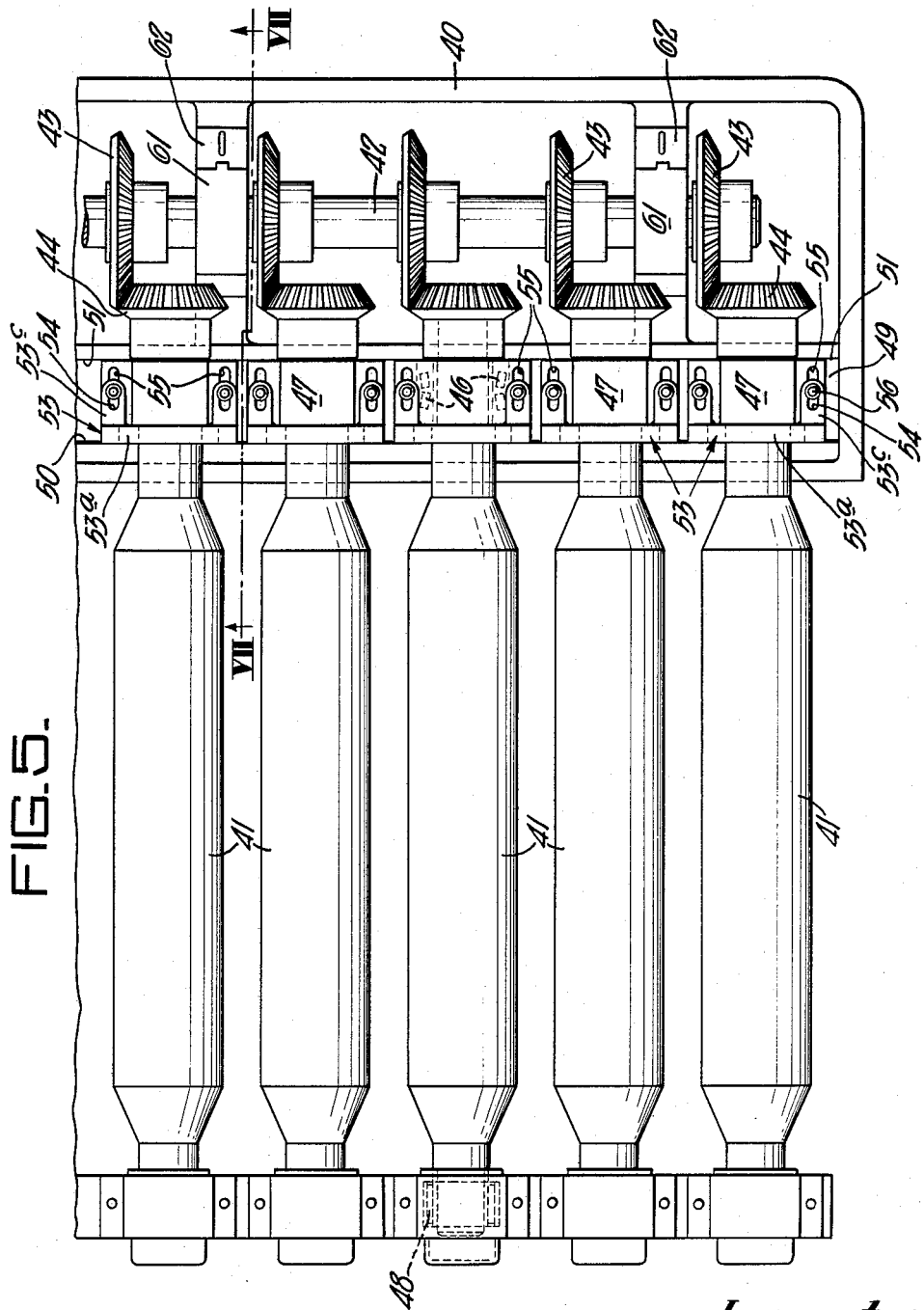

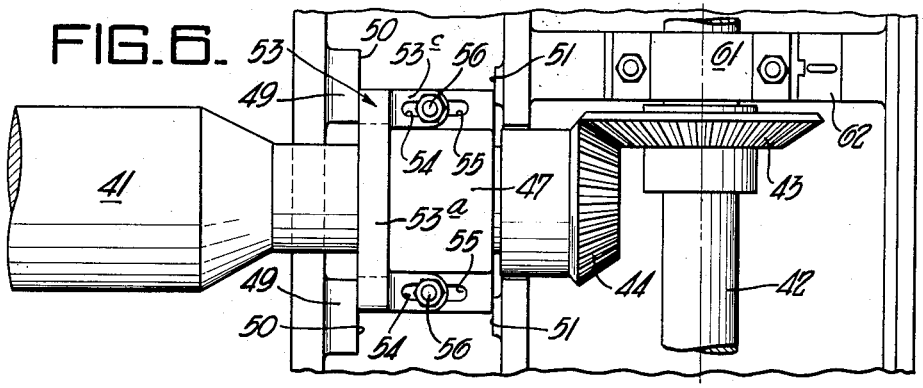
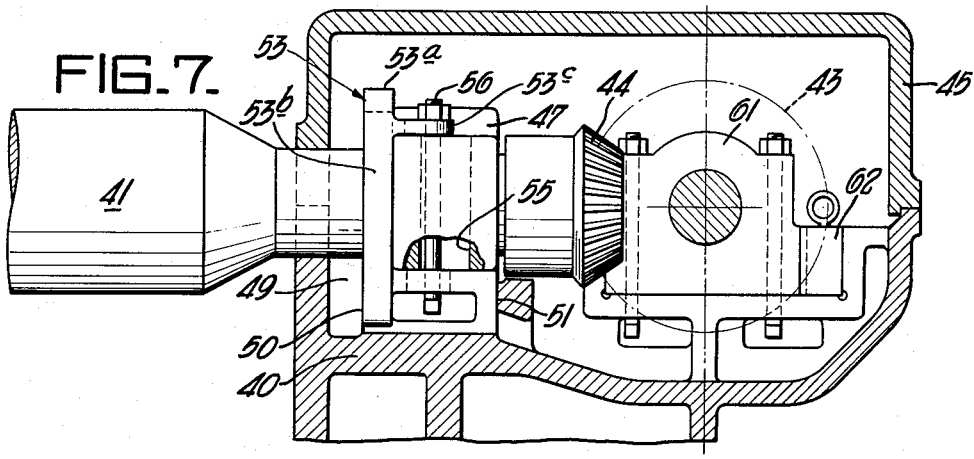
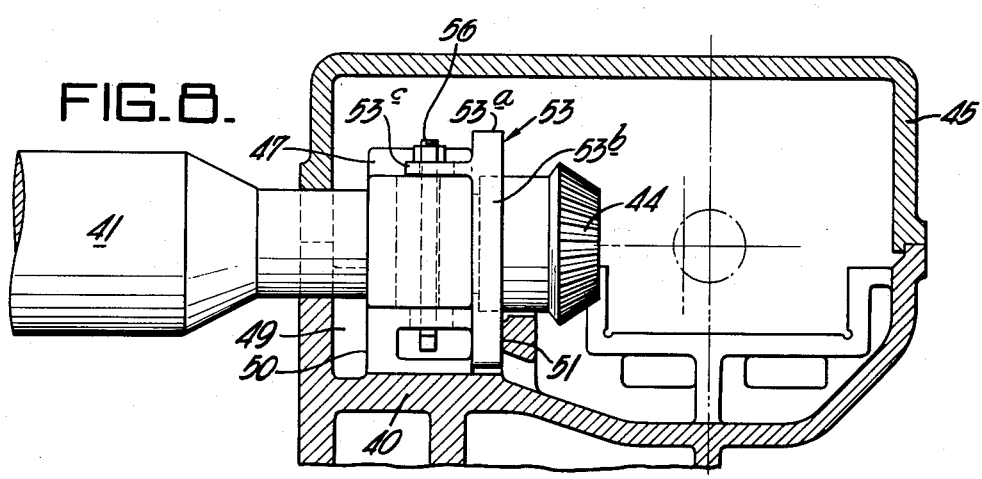
Inventors:
ROSCOE C. BRITTON and
HENRY HALTOF,
by: Donald G. Dalton
their Attorney.

United States Patent Office 2,748,919
Patented June 5, 1956

2,748,919

LINE-SHAFT ROLLER CONVEYOR WITH SHIFTABLE BEARINGS

Roscoe C. Britton and Henry Haltof, Gary, Ind.

Application August 6, 1953, Serial No. 372,711

14 Claims. (Cl. 198—127)

This invention relates to improvements in roller conveyors of the type in which the rolls are driven from a line shaft.

On occasion individual rolls, gears or even the line shaft suffer breakdowns which necessitate their removal and subsequent replacement. To minimize interruptions in conveyor operation, such conveyors commonly are constructed so that the rolls and shafts are as easily removed as possible. Sometimes a conveyor can continue to operate with a broken roll simply removed, and a replacement can be installed later when the equipment is shut down. Nevertheless particular rolls may be critical in that the conveyor cannot operate properly in their absence. If such critical rolls or their gears fail, either a replacement must be installed immediately or else, when time does not permit or none is available, the gear teeth can be burned off completely to allow the roll to remain in place as an idler.

An object of the present invention is to provide an improved roller conveyor in which any individual roll is readily convertible to an idler merely by shifting its position, whereby it can remain in the conveyor despite a breakdown.

A further object is to provide an improved roller conveyor in which the rolls and their thrust bearings and gears are individually shiftable in the direction of the roll axes to disengage their gears from those on the line shaft and thus convert any roll to an idler without affecting the other rolls.

A more specific object is to provide an improved roller conveyor in which the individual rolls are shiftable in the direction of their axes and the thrust bearings of the rolls are held in place by removable keys engageable with one side of a bearing cartridge to produce a live or driven roll and with the other side to produce an idler.

In accomplishing these and other objects of the invention, we have provided improved details of structure, preferred forms of which are shown in the accompanying drawings in which:

Figure 1 is a top plan view of an improved roller conveyor constructed in accordance with our invention, the cover for the line shaft being removed;

Figure 2 is a top plan view of a portion of the conveyor on a larger scale, the cover being removed as in Figure 1;

Figure 3 is a vertical section on line III—III of Figure 2 showing the position of the parts with the gears in mesh;

Figure 4 is a vertical section on line IV—IV of Figure 2 showing the position of the parts with the gears disengaged;

Figure 5 is a top plan view of a portion of a conveyor constructed in accordance with a modified embodiment of our invention, the cover being removed;

Figure 6 is a plan view on a larger scale of a portion of the conveyor shown in Figure 5 with parts broken away;

Figure 7 is a vertical section on line VII—VII of Figure 5 showing the position of the parts with the gears in mesh; and Figure 8 is a vertical section similar to Figure 7, but showing the position with the gears disengaged.

Figures 1 to 4 show a portion of a roller conveyor which comprises a bedplate 10, a plurality of parallel rolls 12 and a pair of axially aligned line shafts 13 and 13a. The line shafts extend at right angles to the roll axes adjacent one end thereof and are driven by any suitable means, such as a pair of motors 14 and 14a and a power transmission mechanism 15 shown only diagrammatically. The line shafts 13 and 13a carry a plurality of bevel gears 16 and 16a respectively, one for each roll 12. The adjacent end of each roll carries a bevel gear 17 which meshes with one of the bevel gears 16 or 16a during normal operation to drive the rolls. The bedplate 10 carries a cover 18 (Figures 3 and 4) for the line shaft and gears.

In accordance with the present invention, any of the rolls 12 can be shifted axially to disengage its gear 17 from the gear 16 or 16a on the line shaft 13 or 13a and thus convert that particular roll to an idler without affecting the other rolls. Figures 2, 3 and 4 show in detail one form of mounting which enables the rolls to be shifted in this fashion. The neck at the driven end of the roll is mounted in an antifriction thrust bearing 19 which is situated between the roll body and the gear 17 and includes a cartridge 20. The bearing along with its cartridge is shiftable relative to the bedplate, but is longitudinally fixed with respect to the roll. The roll neck at the opposite end is mounted in an antifriction bearing 21 in which it is axially slidable. The bearing 21 includes a cartridge 22 mounted on the bedplate 10. The latter cartridge affords a clearance space X (Figure 3) at the end of the roll to permit the latter to shift.

Each cartridge 20 rests on the bedplate 10 and is held in place by a pair of removable keys 23 which are substantially of inverted L shape. Each key has a horizontal arm 23a, a vertical arm 23b and a short horizontal flange 23c at the lower edge of its vertical arm. The horizontal arm contains a slot 24. The bedplate has a series of integral ledges 25, each of which is located between a different adjacent pair of cartridges 20 and contains a pair of keyhole slots 26, one for each cartridge. Each cartridge 20 has a pair of integral apertured projections 27 which are located at each side thereof and overlie the ledges 25. Bolts 28 extend vertically through the slots 24 in the keys, the apertures in the projections 27, and the keyhole slots 26 in the ledges 25.

To hold the gear 17 of any roll in mesh with the corresponding gear 16 or 16a on the line shaft, the keys 23 are mounted with their vertical arms 23b on the inboard side of the cartridge 20, as shown in Figure 3. The flanges 23c bear at one side against the inner wall of the bedplate 10 and at the other side against the inside face of the cartridge 20. To shift any roll so that its gear 17 disengages the line shaft gear, it is only necessary to remove the cover 18, remove the nuts from the bolts 28 of that roll, remove the keys 23, and shove the roll endwise away from the line shaft. As the roll is shifted, the bolts 28 slide in the keyhole slots 26, and the roll neck at the other end slides within its bearing 21 into the clearance space X in the cartridge 22. Thereafter the keys 23 are replaced with their vertical arms 23b on the outboard side of the cartridge 20. The flanges 23c now bear at one side against an integral upstanding flange 29 on the bedplate and at the other side against the outside face of the cartridge 20, as shown in Figure 4. The slots 24 in the horizontal arms 23a of the keys are of a length that enables them to receive the bolts 28 in either position of the keys. The cover 18 can be replaced and is arranged to fit the roll in the new position of the latter, as shown in Figure 4.

Although the line shafts 13 and 13a can be supported on the bedplate 10 in any standard or desired fashion, preferably the mounting is of a type that permits the line shafts to be removed and replaced readily. The mounting means illustrated includes a series of aligned antifriction bearings 30 and a thrust bearing 31 for each line shaft, which bearings are removably fastened to the bedplate. The mounting means for the thrust bearing includes inner and outer keys 32 and 32a, each of which has a keyway 33 in its underside for gripping a complementary flange on the bedplate and a keyway 34 on the face directed toward the bearing for gripping a complementary flange on the bearing housing. The bearing and keys are held in place by vertical bolts 35.

Figures 5 to 8 show a modification which can be employed in conveyors whose rolls are spaced too closely together to accommodate the keys 23. The conveyor shown in these figures comprises a bedplate 40, a plurality of closely spaced rolls 41, and a line shaft 42, which extends at right angles to the roll axes and is driven by any suitable means. The line shaft carries a plurality of bevel gears 43, one for each roll. The adjacent neck of each roll carries a bevel gear 44 which normally engages the corresponding gear on the line shaft for driving the roll. The bedplate carries a removable cover 45 (Figures 6 and 7) for the line shaft and gears.

The neck at the driven end of each roll is supported in an antifriction thrust bearing 46 which is situated between the roll body and the gear 44 and includes a cartridge 47. As in the embodiment already described, the bearing and its cartridge are shiftable relative to the bedplate, but are longitudinally fixed with respect to the roll. The roll neck at the opposite end is slidably mounted in an antifriction bearing 48 similar to the corresponding bearing in the embodiment already described.

Each cartridge 47 rests on the bedplate 40, which has a series of integral upstanding bosses 49, one between each adjacent pair of cartridges. Each of said bosses has inner and outer shoulders 50 and 51 on its upper face. Each cartridge is held in place by a single key 53 of inverted U-shape. Each such key includes a horizontal arm 53a, two vertical arms 53b and a pair of lugs 53c which project from the upper portions of said vertical arms and contain slots 54. Each cartridge 47 contains a pair of vertical slots 55 which are elongated in a direction parallel to the roll axis. Normally the key 53 is located on the inboard side of its cartridge 47, where its horizontal arm 53a spans the roll axis and its vertical arms bear at one side against the inner shoulder 50 and at the other side against the inner face of the cartridge. The lugs 53c extend over the slots 55 in the cartridge. Bolts 56 extend vertically through the slots 54 and 55 in the lugs and cartridge respectively, and through openings in the bosses 49, which are undercut to receive the bolt heads. Thus the key holds the thrust bearing 46 and roll 41 in a position where the gear 44 on the roll neck meshes with the gear 43 on the line shaft 42.

To disengage the gear 44 of any roll 41, the cover 45 is removed, the nuts at the upper ends of the bolts 56 for that roll are removed, the key 53 is removed, and the roll is shoved axially away from the line shaft. The slots 55 permit the cartridge and thrust bearing to move with the roll relative to the bolts 56. The key 53 is turned around and inserted on the outboard side of the cartridge 47. Its vertical arms 53b now bear at one side against the outer shoulder 51 of the bedplate and at the other side against the outer face of the cartridge 47. The slots 54 again receive the bolts 56. The cover 45 then can be replaced.

Again the line shaft 42 can be supported on the bedplate in any standard or desired way, but preferably one which permits it to be removed and replaced easily. In the mounting illustrated the line shaft is carried in a plurality of antifriction bearings 61, all of which are removably bolted to the bedplate and at least one of which is a thrust bearing. A block 62 is inserted between the outside of each bearing and the bedplate to hold the shaft in position where its gears engage those on the rolls. If it is necessary to remove the line shaft and its bearings, the block 62 is first removed. Thereupon the line shaft can be shifted sideways to disengage its gears 43 from the gears 44 on the rolls, and the line shaft lifted from the bedplate.

From the foregoing description it is seen that either embodiment of our invention enables any individual roll to be shifted readily to a position where it becomes an idler. This conversion can be performed with a minimum interruption to conveyor operation. Thus any time there is a breakdown, such as a broken roll or gear, that roll can remain in place as an idler until the conveyor is shut down, when permanent repairs can be made.

While two embodiments of our invention have been shown and described, it will be apparent that other adaptations and modifications may be made without departing from the scope of the following claims.

We claim:

1. A roller conveyor comprising a bedplate, a plurality of parallel rolls and a line shaft rotatably mounted on said bedplate, said line shaft extending at right angles to the axes of said rolls adjacent one end thereof, gears on said line shaft and said rolls adapted to furnish a driving connection therebetween, said rolls being individually axially shiftable, and having a position in which the gears thereon mesh with those on said line shaft and another position in which said gears are disengaged, and means fixing said rolls in either of said positions enabling said rolls to be driven from said line shaft or to operate as idlers.

2. A conveyor as defined in claim 1 in which said last named means includes at least one key for each of said rolls cooperable with the roll bearing and bedplate for fixing the bearing in either of two positions.

3. A conveyor as defined in claim 2 in which there are two removable keys for each roll.

4. A conveyor as defined in claim 2 in which there is a single integral removable key for each roll.

5. A roller conveyor comprising a bedplate, a plurality of parallel rolls, a line shaft, bearings rotatably mounting said rolls and said line shaft on said bedplate with said line shaft at right angles to the roll axes adjacent one end thereof and including a separate thrust bearing for each roll, gears on said line shaft and said rolls adapted to furnish a driving connection therebetween, said rolls and their thrust bearings being individually axially shiftable toward and away from said line shaft and having a position in which the gears thereon mesh with those on said line shaft and a second position in which said gears are disengaged, and means cooperable with said thrust bearings and said bedplate for fixing said rolls and their thrust bearings in either of said positions enabling said rolls to be driven from said line shaft or to operate as idlers.

6. A roller conveyor as defined in claim 5 in which said last named means includes at least one removable key for each thrust bearing, said key being positioned between the inboard side of said bearing and said bedplate to hold the gears in mesh and between the outboard side of said bearing and said bedplate to hold the gears disengaged.

7. A roller conveyor as defined in claim 6 in which there are two keys for each bearing engaging the latter at opposite sides of the roll axis.

8. A roller conveyor as defined in claim 6 in which there is a single integral key of inverted U-shape for each bearing spanning the roll axis and engaging the bearing at opposite sides thereof.

9. A roller conveyor comprising a bedplate, a plurality of parallel rolls, a line shaft, bearings rotatably mounting said rolls and said line shaft on said bedplate with said line shaft at right angles to the roll axes adjacent one end thereof and including for each roll a separate thrust bearing and a bearing which is spaced from the thrust bearing and in which the roll is axially slidable, bevel gears on said line shaft and on the ends of said rolls adapted to furnish a driving connection therebetween, means for driving said line shaft, said rolls and their thrust bearings being individually axially shiftable toward and away from said line shaft and having a position in which the gears thereon mesh with those on said line shaft and a second position in which said gears are disengaged, and at least one key for each roll cooperable with its thrust bearing and said bedplate for fixing the roll and its thrust bearing in either of said positions enabling the roll to be driven from said line shaft or to operate as an idler.

10. A roller conveyor comprising a bedplate, a plurality of parallel rolls, a line shaft, bearings rotatably mounting said rolls and said line shaft on said bedplate with said line shaft at right angles to the roll axes adjacent one end thereof and including for each roll a separate thrust bearing supporting the end adjacent said line shaft and a bearing spaced from said thrust bearing and supporting the other end, said roll being axially slidable with respect to the second bearing, bevel gears on said rolls outside their thrust bearings, bevel gears on said line shaft adapted to engage those on said rolls to furnish a driving connection therebetween, means for driving said line shaft, said rolls and their thrust bearings being axially shiftable toward and away from said line shaft and having a position in which the gears thereon mesh with those on said line shaft and a second position in which said gears are disengaged, and at least one key for each roll cooperable with its thrust bearing and said bedplate for fixing the roll and its thrust bearing in either of said positions enabling the roll to be driven from said line shaft or to operate as an idler.

11. A conveyor as defined in claim 10 in which each of said thrust bearings includes a cartridge, and antifriction means inside said cartridge receiving said roll and being fixed longitudinally with respect thereto, and in which said key is removably attached to said cartridge and bears against the inboard side thereof to hold the gears in mesh and against the outboard side to hold them disengaged.

12. A conveyor as defined in claim 10 in which each of said thrust bearings includes a cartridge, and antifriction means inside said cartridge receiving said roll and being fixed longitudinally with respect thereto, and in which said key has at least one lug removably attached to said cartridge and a portion adapted to bear against either side face of said cartridge and against said bedplate, said portion bearing against the inboard side of the cartridge to hold the gears in mesh and against the outboard side to hold them disengaged.

13. A conveyor as defined in claim 12 in which there are two separate keys for each roll located at opposite sides of the roll axis.

14. A conveyor as defined in claim 12 in which there is a single integral key for each roll spanning the roll axis.

References Cited in the file of this patent

UNITED STATES PATENTS

| | | |
|---|---|---|
| 711,947 | Dittbenner | Oct. 28, 1902 |
| 2,098,492 | Frudden | Nov. 9, 1937 |
| 2,386,946 | Greiner et al. | Oct. 16, 1945 |